United States Patent
Bulvin

Patent Number: 5,901,497
Date of Patent: May 11, 1999

[54] WATER STAKE

[76] Inventor: Robert B. Bulvin, 126 Blackberry Dr., South Fork, Pa. 15956

[21] Appl. No.: 08/909,297

[22] Filed: Aug. 11, 1997

Related U.S. Application Data

[60] Provisional application No. 60/023,916, Aug. 14, 1996.
[51] Int. Cl.$^6$ .......................... A01G 29/00; A01G 17/06
[52] U.S. Cl. .................................. 47/48.5; 47/47
[58] Field of Search .................. 47/44, 47, 46, 47/48.5

[56] References Cited

U.S. PATENT DOCUMENTS

| | | | |
|---|---|---|---|
| 75,636 | 3/1868 | Lamont | 47/47 |
| 2,809,468 | 10/1957 | Eliot | 47/48.5 |
| 2,875,713 | 3/1959 | Shoffner | 47/48.5 |
| 3,345,774 | 10/1967 | Delbuguet | 47/48.5 |
| 3,373,525 | 3/1968 | Cavataio | 47/48.5 |
| 3,471,968 | 10/1969 | Letz | 47/47 |
| 4,393,622 | 7/1983 | Gallo, Sr. | 47/48.5 |

FOREIGN PATENT DOCUMENTS

| | | | |
|---|---|---|---|
| 191693 | 12/1906 | Germany | 47/48.5 |
| 434853 | 10/1967 | Switzerland | 47/48.5 |
| 457083 | 11/1936 | United Kingdom | 47/48.5 |

*Primary Examiner*—Michael J. Carone
*Assistant Examiner*—Fredrick T. French, III

[57] ABSTRACT

A water stake is provided comprising at least one linear tube having a cylindrical configuration with an open top end and an open bottom end. The bottom end is beveled as defined by a cutout formed therein along a plane skewed in relation to an axis of the tube. The bottom opening thus has an upper arc and a lower arc with the lower arc defining a sharp edge. A plurality of linearly aligned circular bores are formed in the tube. The circular bores resides along a line which lies in a first plane defined by the upper arc and lower arc of the bottom end. A plurality of plant ties each have an L-shaped configuration with a long horizontal extent having a first end coupled to the tube in perpendicular relationship with the axis thereof. A short vertical extent is integrally coupled to a second end of the long horizontal extent and extends upwardly therefrom. Finally, a cup is included which defines an interior space with a top opening. A bottom face of the cup is integrally coupled to the open top end of the tube and in communication with the bottom end and the plurality of circular bores thereof.

1 Claim, 3 Drawing Sheets

WATER STAKE

RELATED APPLICATION

The present application relates to a provisional application filed Aug. 14, 1996 under application Ser. No. 60/023,916.

BACKGROUND OF THE INVENTION

1. Field of the Invention

The present invention relates to a water stake and more particularly pertains to watering plants such as tomatoes and peppers.

2. Description of the Prior Art

The use of plant watering apparatuses is known in the prior art. More specifically, plant watering apparatuses heretofore devised and utilized for the purpose of watering various plants are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,067,274; U.S. Pat. No. 4,745,706; U.S. Pat. No. 4,021,965; U.S. Pat. No. 3,471,968; U.S. Pat. No. 1,984,265; U.S. Pat. No. 1,589,400; and U.S. Pat. No. 500,140.

In this respect, the water stake according to the present invention substantially departs from the conventional concepts and designs of the prior art, and in so doing provides an apparatus primarily developed for the purpose of watering plants such as tomatoes and peppers.

Therefore, it can be appreciated that there exists a continuing need for a new and improved water stake which can be used for watering plants such as tomatoes and peppers. In this regard, the present invention substantially fulfills this need.

SUMMARY OF THE INVENTION

In view of the foregoing disadvantages inherent in the known types of plant watering apparatuses now present in the prior art, the present invention provides an improved water stake. As such, the general purpose of the present invention, which will be described subsequently in greater detail, is to provide a new and improved water stake which has all the advantages of the prior art and none of the disadvantages.

To attain this, the present invention essentially comprises at least one first hollow stake. Each first hollow stake includes a linear tube having a cylindrical configuration with an open top end and an open bottom end. The bottom end has a periphery which resides in a horizontal plane. As shown in FIGS. 4 & 5, a plurality of plant ties are provided each having an L-shaped configuration. As such, each plant ties is formed of a long horizontal extent having a first end coupled to the tube in perpendicular relationship with the axis thereof. A short vertical extent is integrally coupled to a second end of the long horizontal extent and extends upwardly therefrom. A cup is provided having a rectangular configuration with a rectangular bottom face. Integrally coupled to the bottom face is a pair of rectangular side faces and a pair of square side faces extending upwardly therefrom for defining an interior space with a top opening. The bottom face of the cup is integrally coupled to the open top end of the tube and in communication with the bottom end thereof. With reference now to FIGS. 4 and 6, at least one second hollow stake is provided. Each second hollow stake includes a linear tube having a cylindrical configuration with an open top end and an open bottom end, similar to the first hollow stakes. The bottom end, however, is beveled as defined by a cutout formed therein along a plane skewed in relation to an axis of the tube. As such, the bottom opening has an upper arc and a lower arc with the lower arc defining a sharp edge. Note FIG. 6. A plurality of linearly aligned circular bores are formed in the tube of the second hollow stakes. The circular bores reside along a line which lies in a first plane defined by the upper arc and lower arc of the bottom end. Further, the bores are situated only in a bottom ⅓ portion of the tube. Similar to the first hollow stakes, a plurality of plant ties each having an L-shaped configuration are provided. Each plant tie has a long horizontal extent having a first end coupled to the tube in perpendicular relationship with the axis thereof and a short vertical extent integrally coupled to a second end of the long horizontal extent and extended upwardly therefrom. Each of the plant ties entirely resides in the first plane. The plant ties are only positioned in a top ⅓ portion of the tube. Next provided is a coupling sleeve having a cylindrical configuration. Such coupling sleeve is integrally coupled in coaxially alignment with the top end of the tube and further in fluid communication with the bottom end of the tube. It should be noted that an interior diameter of the coupling sleeve is equal to the outer diameter of the tube of the first hollow stake. By this structure, the bottom end of the first hollow stake may be removably coupled within the coupling sleeve of the second hollow stake such that the bottom end of the second hollow stake and the circular bores may be inserted within the ground. This allows water which is inserted within the cup of the first hollow stake to water a plant situated adjacent the present invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water stake which has all the advantages of the prior art plant watering apparatuses and none of the disadvantages.

It is another object of the present invention to provide a new and improved water stake which may be easily and efficiently manufactured and marketed.

It is a further object of the present invention to provide a new and improved water stake which is of a durable and reliable construction.

An even further object of the present invention is to provide a new and improved water stake which is susceptible of a low cost of manufacture with regard to both materials and labor, and which accordingly is then susceptible of low prices of sale to the consuming public, thereby making such water stake economically available to the buying public.

Still yet another object of the present invention is to provide a new and improved water stake which provides in the apparatuses and methods of the prior art some of the advantages thereof, while simultaneously overcoming some of the disadvantages normally associated therewith.

Still another object of the present invention is to water plants such as tomatoes and peppers.

Lastly, it is an object of the present invention to provide a new and improved water stake comprising at least one linear tube having a cylindrical configuration with an open top end and an open bottom end. The bottom end is beveled as defined by a cutout formed therein along a plane skewed in relation to an axis of the tube. The bottom opening thus has an upper arc and a lower arc with the lower arc defining a sharp edge. A plurality of linearly aligned circular bores are formed in the tube. The circular bores resides along a line which lies in a first plane defined by the upper arc and lower arc of the bottom end. A plurality of plant ties each have an L-shaped configuration with a long horizontal extent having a first end coupled to the tube in perpendicular relationship with the axis thereof. A short vertical extent is integrally coupled to a second end of the long horizontal extent and extends upwardly therefrom. Finally, a cup is included which defines an interior space with a top opening. A bottom face of the cup is integrally coupled to the open top end of the tube and in communication with the bottom end and the plurality of circular bores thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
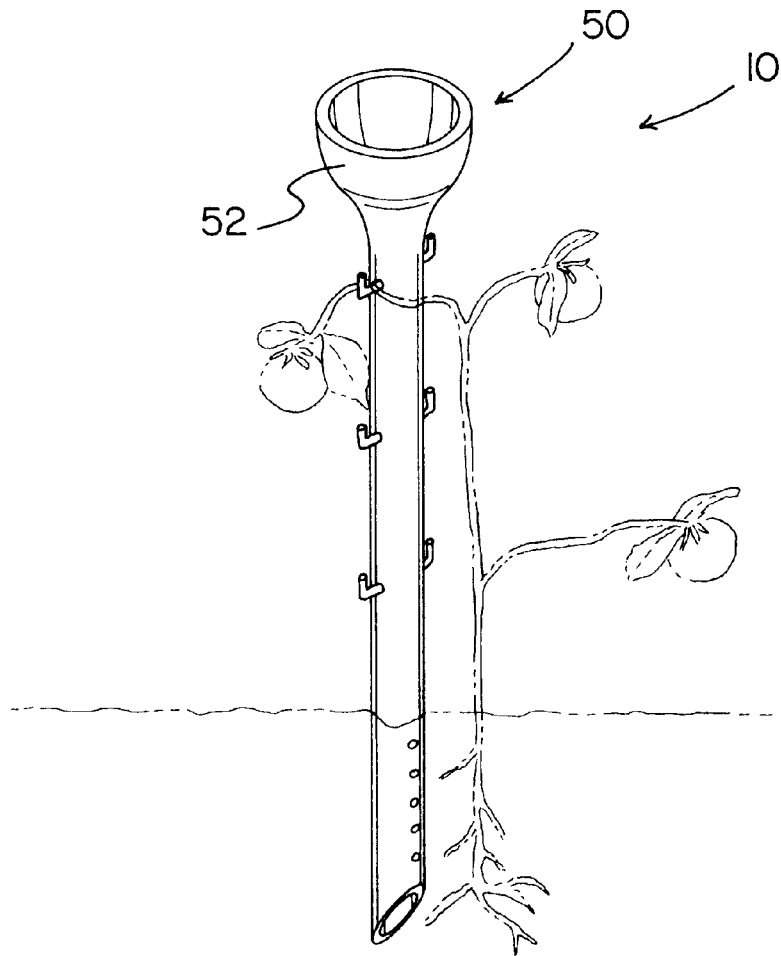
FIG. 1 is a perspective illustration of one of embodiments of the present invention.

With reference now to the drawings, and in particular to FIG. 1 thereof, a new and improved water stake embodying the principles and concepts of the present invention and generally designated by the reference numeral 10 will be described.

The present invention, the new and improved water stake, is comprised of a plurality of components. Such components in their broadest context include a first hollow stake and a second hollow stake. Such components are individually configured and correlated with respect to each other so as to attain the desired objective.

More specifically, it will be noted that the system 10 of the present invention includes at least one first hollow stake 12. Note FIG. 4. Each first hollow stake includes a linear tube 14 having a cylindrical configuration with an open top end 16 and an open bottom end 18. The bottom end has a periphery which resides in a horizontal plane.

Figure 4:
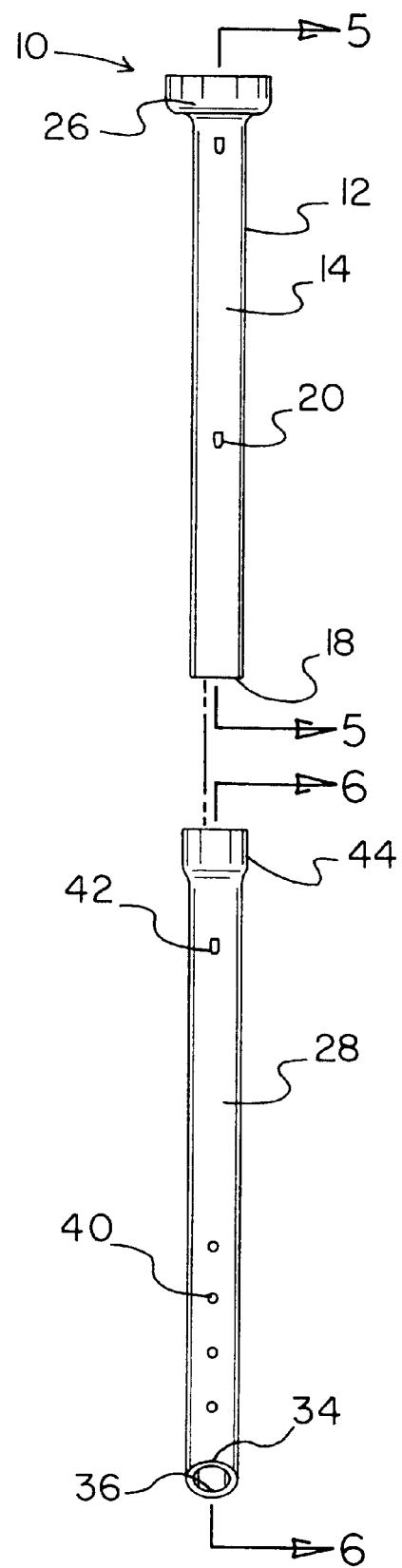
FIG. 4 is an exploded view of another embodiment of the present invention.
Figure 5:
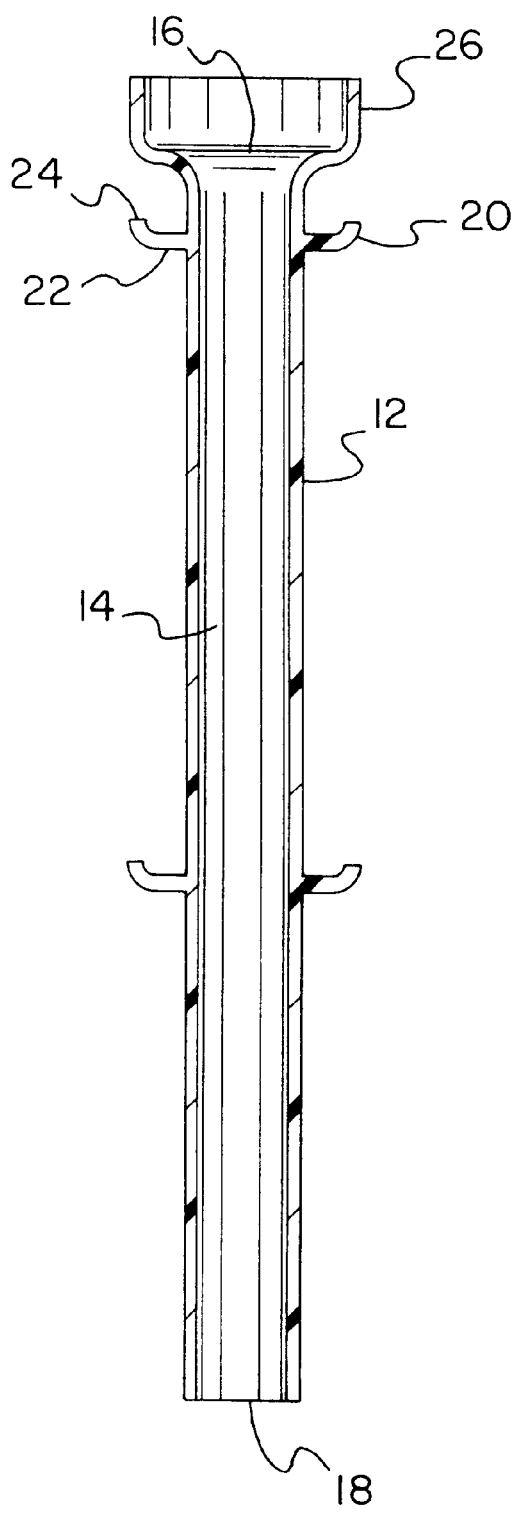
FIG. 5 a cross-sectional view of the first hollow stake of the embodiment of FIG. 4.

As shown in FIGS. 4 & 5, four plant ties 20 are provided each having an L-shaped configuration. As such, each plant ties is formed of a long horizontal extent 22 having a first end integrally and fixedly coupled to the tube in perpendicular relationship with the axis thereof. A short vertical extent 24 is integrally coupled to a second end of the long horizontal extent and extends upwardly therefrom. Preferably, one pair of plant ties is positioned adjacent the top end and a second pair of plant ties are positioned at a central extent of the tube. In use, the specific nature of the plant ties are critical for accommodating tomato and pepper plants.

A cup 26 is provided having a rectangular configuration with a rectangular bottom face. Integrally coupled to the bottom face is a pair of rectangular side faces and a pair of square side faces extending upwardly therefrom for defining an interior space with a top opening. The bottom face of the cup is integrally coupled to the open top end of the tube in communication with the bottom end hereof. It should be noted that the rectangular cup defines a T-shaped handle with the tube for reasons that will become apparent later.

Figure 6:
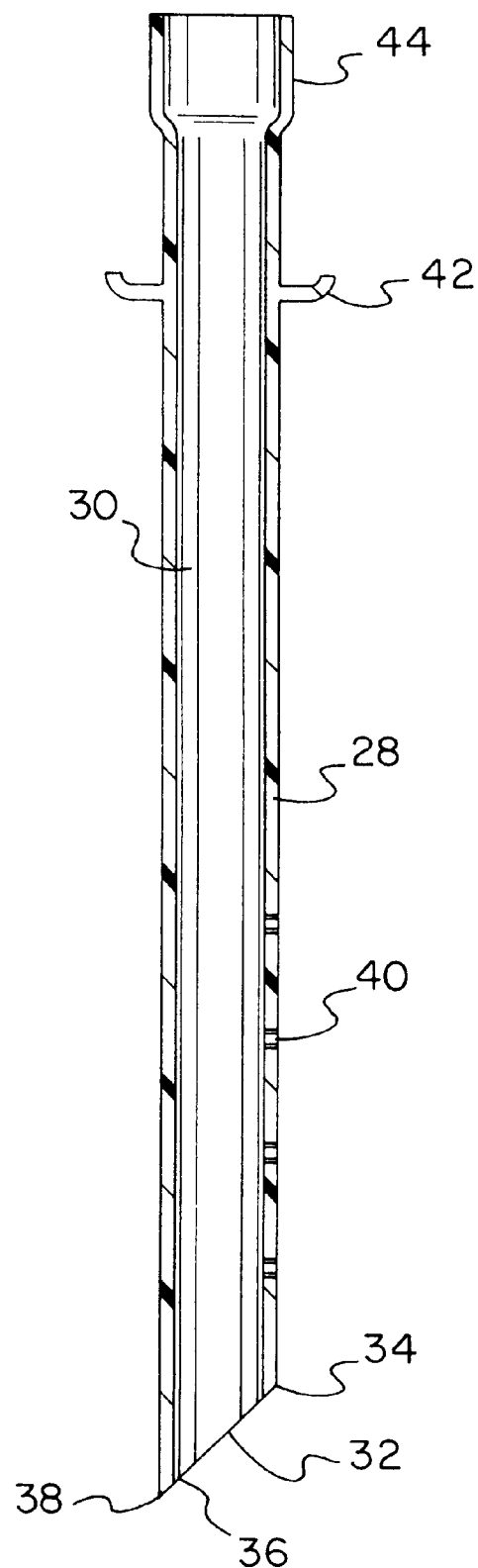
FIG. 6 is a cross-sectional view of the second hollow stake of the embodiment of FIG. 4.

With reference now to FIGS. 4 and 6, at least one second hollow stake 28 is provided. Each second hollow stake includes a linear tube 30 having a cylindrical configuration with an open top end and an open bottom end, similar to the first hollow stakes. It is imperative that the tubes of the first and second hollow stakes have a common height and a common inner and outer diameter. The bottom end of the second hollow stake, however, is beveled as defined by a cutout 32 formed therein along a plane skewed in relation to an axis of the tube. As such, the bottom opening has an upper arc 34 and a lower arc 36 with the lower arc defining a sharp edge 38. Note FIG. 6.

Four linearly aligned circular bores 40 are formed in the tube of the second hollow stakes. The circular bores reside along a line which lies in a first plane defined by the upper arc and lower arc of the bottom end. Further, the bores are situated only in a bottom ⅓ of the tube. Ideally, the bores are spaced 2 inches. It should be noted that with the exception of the bores and top and bottom openings, the tube is closed.

Similar to the first hollow stakes, a pair of plant ties 42 each having an L-shaped configuration are provided with the second hollow stake. Each plant tie has a long horizontal extent having a first end coupled to the tube in perpendicular relationship with the axis thereof and a short vertical extent integrally coupled to a second end of the long horizontal extent and extended upwardly therefrom. Each of the plant ties entirely resides in the first plane. The plant ties are only positioned in a top ⅓ of the tube. Preferably, only one pair of ties are included and positioned adjacent the top end of the tube. All of the pairs of the plant ties of the present invention have the horizontal extent thereof in linear alignment.

Next provided with the second hollow stake is a coupling sleeve 44 having a cylindrical configuration. Such coupling sleeve is integrally coupled in coaxially alignment with the top end of the tube and further in fluid communication with the bottom end of the tube. It should be noted that an interior diameter of the coupling sleeve is equal to the outer diameter of the tube of the first hollow stake.

By this structure, the bottom end of the first hollow stake may be removably coupled within the coupling sleeve of the second hollow stake such that the bottom end of the second hollow stake and the circular bores may be inserted within the ground. This allows water which is inserted within the cup of the first hollow stake to water a plant situated adjacent the present invention. Preferably, the coupling sleeve defines a ledge positioned adjacent the top end of the tube of the second hollow stake for precluding the free sliding of the first hollow stake within the second hollow stake.

Figure 2:
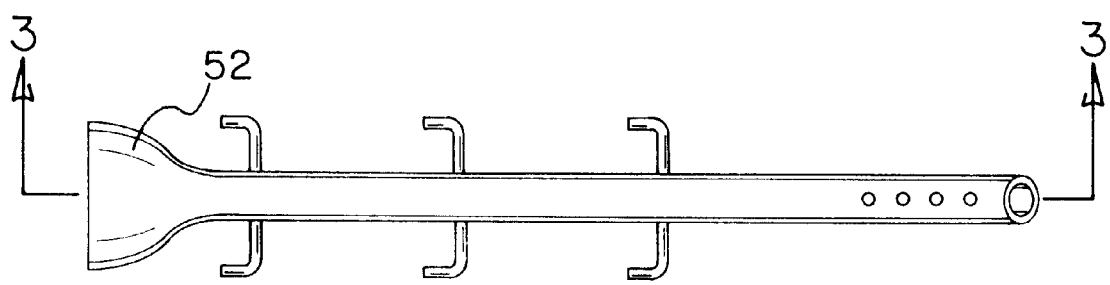
FIG. 2 is a side view of the embodiment of the present invention shown in FIG. 1.
Figure 3:
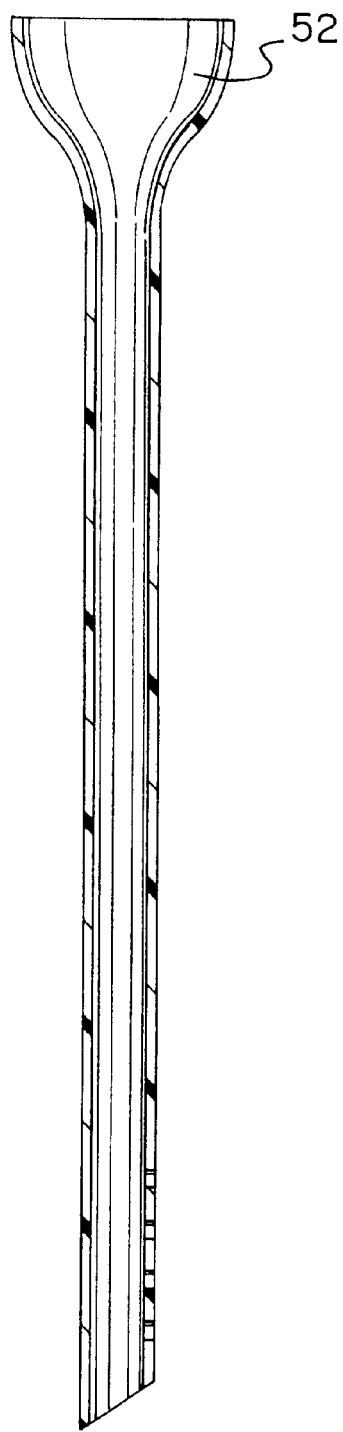
FIG. 3 is a cross-sectional view taken along line 3—3 shown in FIG. 2.

An alternate form 50 of the present invention is shown in FIGS. 1–3. It should be noted that such embodiment has essentially all of the components as the first embodiment with the exception of the coupling sleeve. A few additional modifications made to the present embodiment include the inclusion of a semispherical cup 52 with a bottom apex thereof integrally coupled to the top opening of the tube. Further, the plant ties of the present embodiment the circular bores resides only in a bottom ⅓ of the tube and the plant ties are only positioned in a top ⅔ of the tube. Each of the plant ties entirely reside in a second plane that is perpendicular with respect to the first plane. It should be understood that such modifications may further be incorporated in the first embodiment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water stake comprising, in combination:

at least one of a first hollow stake, each first hollow stake including:

a linear tube having a cylindrical configuration with an open top end and an open bottom end, the bottom end having a periphery which resides in a horizontal plane, a plurality of plant ties each having an L-shaped configuration with a long horizontal extent having a first end coupled to the tube in perpendicular relationship with the axis thereof and a short vertical extent integrally coupled to a second end of the long horizontal extent and extending upwardly therefrom, a cup having a rectangular configuration with a rectangular bottom face having a pair of rectangular side faces and a pair of square side faces integrally coupled thereto and extending upwardly therefrom for defining an interior space with a top opening, the bottom face of the cup being integrally coupled to the open top end of the tube and in communication with the bottom end thereof; and at least one of a second hollow stake, each second hollow stake including:

a linear tube having a cylindrical configuration with an open top end and an open bottom end, the bottom end being beveled as defined by a cutout formed therein along a plane skewed in relation to an axis of the tube, the bottom opening thus having an upper arc and a lower arc with the lower arc defining a sharp edge, a plurality of linearly aligned circular bores formed in the tube of the second hollow stake, the circular bores residing along a line which lies in a first plane defined by the upper arc and lower arc of the bottom end of the tube of the second hollow stake, the bores residing only in a bottom ⅓ portion of the tube of the second hollow stake, a plurality of plant ties each having an L-shaped configuration with a long horizontal extent having a first end coupled to the tube of the second hollow stake in perpendicular relationship with the axis thereof and a short vertical extent integrally coupled to a second end of the long horizontal extent and extending upwardly therefrom, each of the plant ties entirely residing in the first plane, the plant ties only positioned in a top ⅓ portion of the tube, a coupling sleeve having a cylindrical configuration and integrally coupled in coaxially alignment with the top end of the tube of the second hollow stake and in fluid communication with the bottom end of the tube of the second hollow stake, an interior diameter of the coupling sleeve being equal to the outer diameter of the tube of the first hollow stake; whereby the bottom end of the first hollow stake may be removably coupled within the coupling sleeve of the second hollow stake such that the bottom end of the second hollow stake and the circular bores may be inserted within the ground thereby allowing water which is inserted within the cup of the first hollow stake to water a plant situated adjacent the plant.

* * * * *